United States Patent [19]
Bruckstein et al.

[11] Patent Number: 5,995,214
[45] Date of Patent: Nov. 30, 1999

[54] PROCESS FOR POSE ESTIMATION OF A CAMERA VIEWING AN IMAGE SCENE

[75] Inventors: Alfred M. Bruckstein, Haifa, Israel; Robert J. Holt, Scotch Plains, N.J.; Thomas S. Huang, Urbana, Ill.; Arun Narayan Netravali, Westfield, N.J.

[73] Assignee: Lucent Technologies, Murray Hill, N.J.

[21] Appl. No.: 08/989,533

[22] Filed: Dec. 12, 1997

Related U.S. Application Data

[60] Provisional application No. 60/055,553, Aug. 13, 1997.

[51] Int. Cl.⁶ .............................. B64F 1/18; B64D 47/06; G01B 11/26
[52] U.S. Cl. ...................... 356/152.1; 340/955; 340/982; 356/138; 356/141.2
[58] Field of Search ...................... 348/113, 135; 356/152.1, 139.03, 141.2, 141.5, 138; 340/955, 982; 382/151, 153; 250/559.37, 206.2

[56] References Cited

U.S. PATENT DOCUMENTS

| | | |
|---|---|---|
| 3,662,180 | 5/1972 | Jorgensen et al. . |
| 3,704,070 | 11/1972 | Johnson et al. . |
| 3,885,876 | 5/1975 | Konopka ................................. 356/153 |
| 4,166,699 | 9/1979 | Bergkvist ............................... 356/375 |
| 4,219,807 | 8/1980 | Speck et al. ........................... 340/664 |
| 4,710,620 | 12/1987 | Kunkel . |
| 4,777,360 | 10/1988 | Carner, Jr. . |
| 4,804,832 | 2/1989 | Gardner . |
| 4,877,959 | 10/1989 | Page ..................................... 250/336.1 |
| 5,175,645 | 12/1992 | Bennett et al. . |
| 5,267,014 | 11/1993 | Prenninger ........................ 359/139.03 |
| 5,510,893 | 4/1996 | Suzuki ............................... 356/139.03 |

*Primary Examiner*—Stephen C. Buczinski

[57] ABSTRACT

Pose estimation of a camera is facilitated by including in the scene a space fiducial, an object that has the property that its appearance as viewed by the camera uniquely determines the direction from which it is viewed.

8 Claims, 9 Drawing Sheets

PROCESS FOR POSE ESTIMATION OF A CAMERA VIEWING AN IMAGE SCENE

RELATED APPLICATION

This application is related to our Provisional Application Ser. No. 60/055,553 filed Aug. 13, 1997 (designated our Case 4-2-1-71).

This invention relates to computer vision and more particularly to a technique for estimating the pose of the camera taking the picture of a scene from specially designed objects in the scene.

BACKGROUND OF THE INVENTION

There are various occasions, such as when a camera is on a mobile robot, when it is important to ascertain from the view seen by the camera of the pose (i.e., the position and orientation) of the camera. Typically this is done by searching the view for known features, either shapes or points, as determined by edges and corners of known objects or for specially designed calibration objects known to be in the picture scene. If there is known the geometry of the features and if one can uniquely identify them in a perspective image taken by a camera whose intrinsic parameters are known, then pose estimation becomes a classical problem of photogrammetry and computer vision. Such problems are amenable to solution by known techniques. In these cases, however, pose estimation generally involves first determining the precise location (via sophisticated image analysis algorithms) of the features whose intrinsic geometry was assumed to be already known. This reduces the problem to the equivalent algebraic-like framework of feature points whose precise perspective projection is provided by the images seen.

However, such currently used methods are based on feature identification and require rather extensive image processing and analysis to locate with the required precision the geometric elements necessary for the algebraic computation of the desired spatial pose.

In spite of the fact that it was recognized early on that in many cases of practical importance one can actually produce and deploy in the environment being viewed calibration objects, such objects were generally designed with the aim of making it easier for the image analysis procedures to locate precisely various features. The present invention takes a new approach that should usually lead to the simplification of the image analysis procedures.

SUMMARY OF THE INVENTION

The present invention achieves the desired simplification by more fully exploring the freedom in designing self-location objects, to be described hereinafter as space fiducials. A space fiducial, as used herein, is an object that will provide in an image of it taken by a camera direct and immediate information about depth its location and the direction at which the camera is pointed. A feature of this invention is the use of such space fiducials in the image scene that, together with the optics and geometry of the camera, implicitly perform reasonably precise analog (optical) computations that result in the camera direction being encoded directly in some gray-level or color or temporal pattern that will appear in the image observed. In particular, the invention provides a number of specific space fiducials, the inclusion of any of which in the scene being photographed will provide a gray-level or color-coded readout of the pose of the camera doing the photography. In particular, it is characteristic of each of these space fiducials that they experience a systematic change of appearance or hue as viewed from different directions, which change in appearance or hue can be captured by the camera, and from which one can recover the direction of viewing by the camera.

Typically the space fiducial will be a static object but by use of a dynamic space fiducial the temporal dimension can also be used to facilitate the process of pose estimation.

The invention will be better understood from the following more detailed description taken in conjunction with the accompanying drawing.

BRIEF DESCRIPTION OF THE DRAWING

Each of FIGS. 1, 2, 3, 7, 9, 10, 13, 14, 15, 16, and 19 shows a different space fiducial of a kind possible for use in the invention.

Each of FIGS. 4, 5, 6, 8, 11, 12, 17, and 18 will be useful in describing properties of a particular space fiducial shown in one of the figures mentioned above.

DETAILED DESCRIPTION

Figure 1:
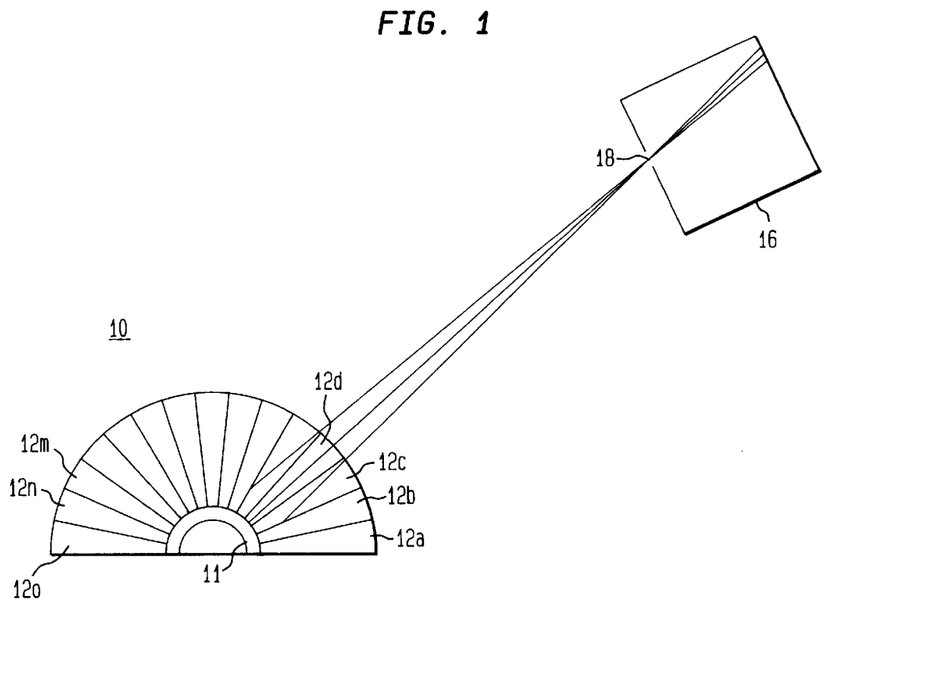

With reference now to the drawing, FIG. 1 shows a transparent dome-shaped element 0 that includes a central core 12 from which radiate a number of light guiding cones 12A–12O each cone having a unique orientation with respect to the core 12. The core 12 can be likened to one of the two dome-shaped compound eyes of an insect, such as a praying mantis. The praying mantis has a pair of huge (as compared to the body) dome-shaped compound eyes comprising many thin radial light guides leading any captured light towards sensors located at the center of the dome. In a high resolution image of such an insect, one always perceives on the surface of the eye-domes a pair of dark spots. Moreover, if one observes or films these insects in motion, these dark spots seem to follow the viewer or camera, as though the eye-domes have moving irises with a dark pupil at their center. The apparently mobile dark pupils are tagging the light guides whose directions point at the viewing device's focal point. These are the only light guides that allow glimpses of their deep base while in the others one sees only their opaque sidewalls up to various depths. This phenomenon is utilized in the space fiducial shown in FIG. 1 where the cones 12A–12O with opaque sidewalls lead to the dark core 11 centered in the dome. It will be seen that the core is seen by the camera 16 only through the cone 12D in line with the optic center 18 of the camera. It can accordingly be appreciated that the particular light guide that shows a dark spot corresponding to the core of the dome provides an indication of the orientation of the camera with respect to the dome. Accordingly if such an object were included in the scene being viewed and a light source were provided at the core of the dome-shaped object, the identity of the particular light guide or cone that lit up in the photograph of the object would be a measure of the orientation of the camera.

An improved arrangement can be achieved if each of light guides 12 acts as a filter that passes light of a different narrow band of wavelengths or has a different spectral signature, and a strong source of white or broad band light source serves as the core 11. Then as viewed by the camera, the central spot will change color as it tracks the camera focal point.

This provides, via the red/green/blue values of the image sensor, an immediate and unique labeling of the camera's direction. With a pair of such dome-shaped objects, one could get from the color of the two resulting spots an immediate readout of the camera location with little sophisticated image processing. One could even use a color-to-direction lookup table, such as could be provided by a read-only memory, to get immediate direction-readouts. To facilitate this approach, the pair of domes should be easily located in the image, and this can be done by having the two domes placed on a readily recognizable brightly colored planar base.

In place of the cone-shaped compound eye-like space fiducial one can substitute a two-dimensional rectangular array or stack of long cylinders or pipes, at one end of each of which there is provided a strong source of white or broad-band light. If each of the cylinders is made to perform as a narrow band filter and be transmissive of light of a different, single or narrow, band of light, the color of light viewed at the camera by identifying a particular cylinder will similarly provide an indication of the orientation of the camera.

It can be appreciated that these geometric arrangements of light sources and filters yield a color-coded readout of the direction of the direction. The same result can be achieved by enclosing a white light point source at the center of a transparent hemisphere multi-colored in such a way that the color seen uniquely identifies the latitude and longitude of the point illuminated in the image. Clearly a number of other arrangements operating on similar principles can readily be devised.

Another approach to a satisfactory space fiducial is based on principles that have been employed by the artist Yaacov Agam in op-art that combines two or more images in a single picture. The two images are separately decomposed into a series of thin vertical bands or strips of equal size and these are alternately placed on a serrated surface such that an observer from a distance far enough on the left sees only the left-facing strips of the prisms while from a distance far enough on the right only the right-facing strips are seen. Then as an observer moves from left to right, there is effectively seen less of the left-facing strips and more of the right-facing strips and, conversely as one moves from right to left, there is seen more of the left-facing strips and less of the right-facing strips. Now if one were to color the left-facing strips white and the right-facing strips black, there would result a direction-readout from the gray scale seen at a particular direction.

Figure 2:
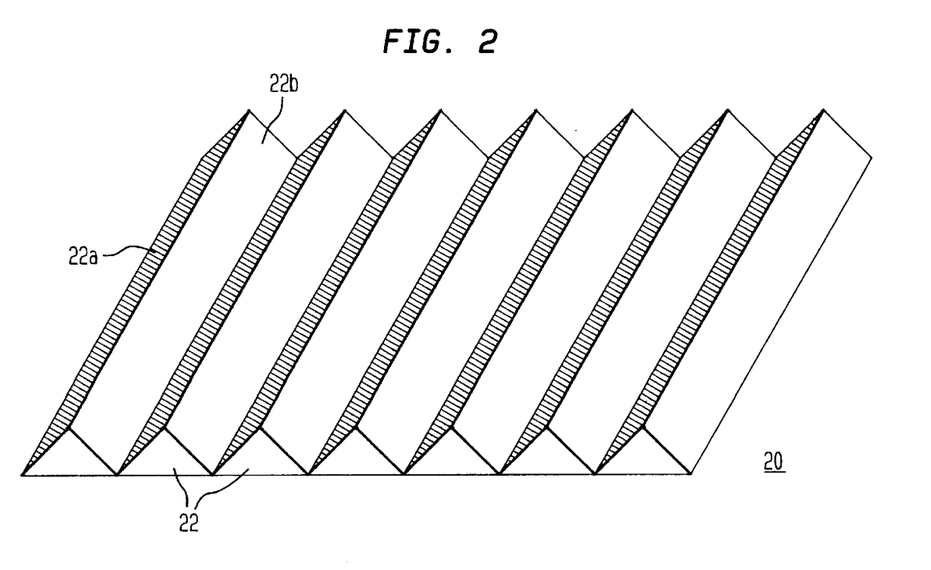

Such an arrangement 20 is shown in FIG. 2 where a row of identical triangular prisms 22 are placed side by side, each of which has its left-facing surface 22A painted black, while each of the right-facing surfaces 22B is painted white, so that as an observer viewing the arrangement moves from left to right there is observed a gradual shifting in gray scale.

Figure 3:
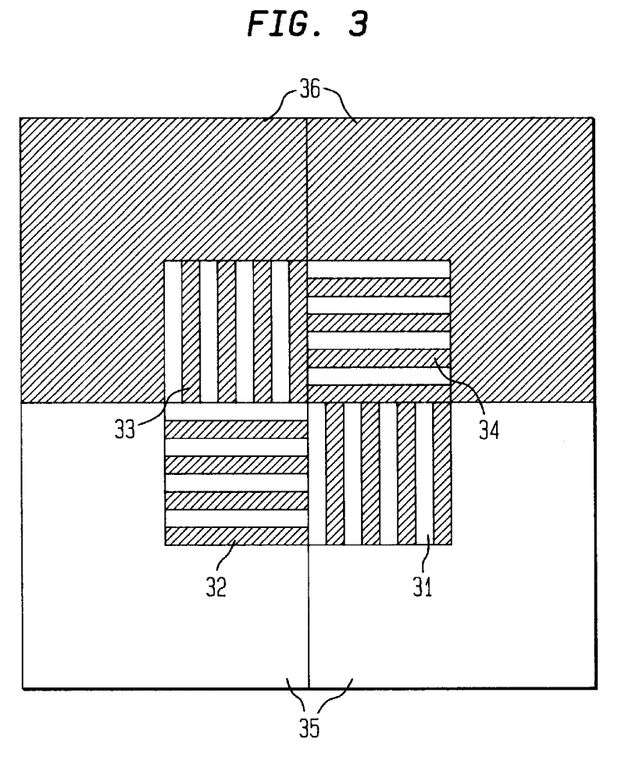

In FIG. 3 there is depicted an overhead view of a space fiducial 30 based on this principle. It includes four central quadrants 31–34, each comprising rows of identical triangular prisms of the kind shown in FIG. 2, each with one white and one black surface. Although, for the sake of simplicity, only four rows of prisms are shown in each quadrant, in practice there could be more, for example twenty (20), each having a pair of rectangular surfaces, for example 1 by 20 millimeters, or other convenient size. Moreover two of the quadrants 31, 32 are shown on a white base 35 and two 33, 34 on a black base 36. When viewed at a distance each of the four quadrants is seen as a distinctive shade of gray, with the gray levels observed determining the viewing angles. The use of horizontal and vertical strips in each quadrant allows the determination of viewing at least two angles, which suffice to determine the viewing direction. It should be appreciated that the quadrants could be arranged in other patterns.

Figure 4:
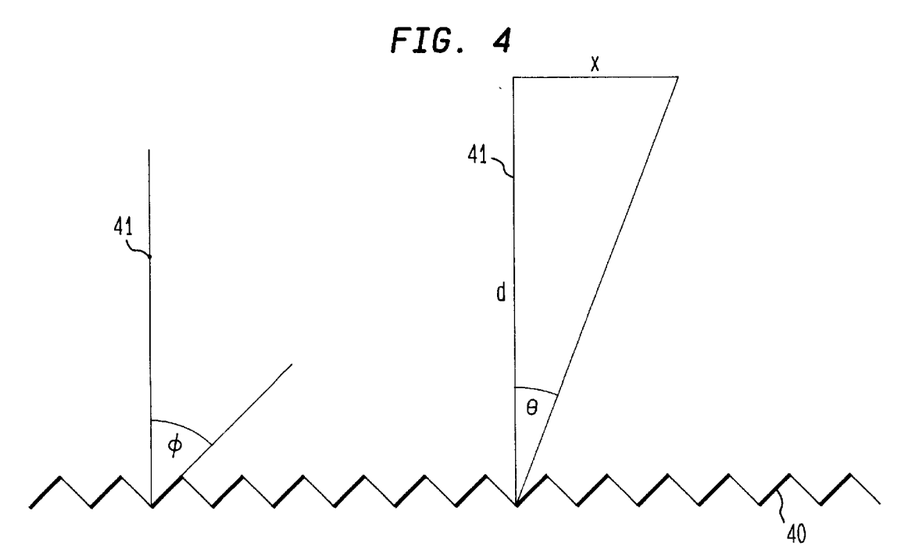

In FIG. 4 there is shown a cross section of a portion of a space fiducial 40 involving serrated surfaces of the kind discussed. Vertical lines 41 make an angle $\phi$ with the plane segment of the fiducial and an angle $\theta$ with the line of sight 42. The heavy and light lines indicate surfaces of the fiducial 40 painted black and white, respectively. Orthographic projection is assumed.

Figure 5:
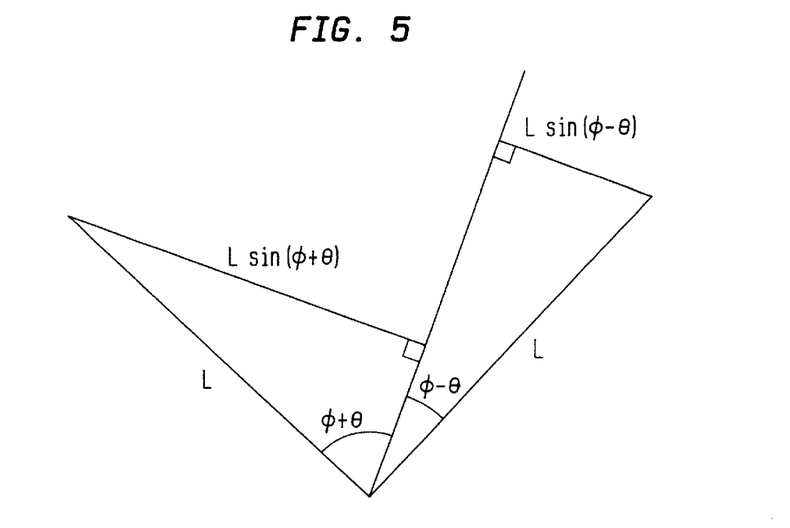

This fiducial has the remarkable property that if one travels parallel to the plane of its base at a constant rate, the gray-scale value also changes at a constant rate. Consider a piece of the fiducial, as shown in FIG. 4. Let the angle a planar segment makes with a line perpendicular to the base be $\phi$. The angle $\phi$ may be any value between 0 and $\pi/2$ radians and then the range of $\theta$ is $[-\phi, \phi]$. If $\theta<-\phi$ or $\phi>\phi$, we see an all-black or all-white image, respectively. We will assume an orthographic projection since for our purposes the viewing distance will be large in comparison with the size of the fiducial. Also let L be the width of one of the plane segments, and g be the gray-level observed. Now consider the length of the projections of the black and white pieces onto a line perpendicular to the viewing direction as shown in FIG. 5. These lengths are L sin ($\phi-\theta$) and L sin ($\phi+\theta$), respectively. Therefore the gray-level observed by averaging these two numbers is $$g = \frac{L\sin(\phi+\theta)}{L\sin(\phi+\theta)+L\sin(\phi-\theta)}N = \frac{N}{2}\left(1+\frac{\tan\theta}{\tan\phi}\right) \quad (1)$$

where N is the gray-level of white, typically 255. Referring back to FIG. 5, tan $\theta$=x/d, where d is the perpendicular distance to the fiducial and x measures distance along the length of the fiducial. Therefore if x increases at a constant rate, so does tan $\theta$, and the gray-level value.

Given a gray-level value of g out of N, with N usually 255, $\theta$ is determined from Equation (1) as $$\theta = \tan^{-1}\left[\left(\frac{2g}{N}-1\right)\tan\phi\right]. \quad (2)$$

The black and white borders serve to calibrate the gray-scale. Another possibility is to have a sequence of gray-levels around the perimeter which could make it easier for the camera to determine the values of the gray-levels in the center of the fiducial.

Note that in the example discussed above two uniform images are used to build the fiducial. However, there are further possibilities. Instead of a fiducial that distinguishes only angles $\theta$ in $[-\phi, \phi]$, we can construct one that can distinguish all angles $\theta$ between $-\pi/2$ and $\pi/2$ by using two non-solid patterns on the alternating strips. Specifically, let $x_1$ and $x_2$ be measures of the distances along the width of a "right-facing" and "left-facing" strip, respectively, and assume each strip has unit width. Then the intensity functions $I_1(x_1)=[(1-x_1)/2]N$ and $I_2(x_2)=[(2-x_2)/2]N$ provide a pattern in which the observed gray-level increases monotonically as $\theta$ ranges from $-\pi/2$ to $\pi/2$.

Figure 6:
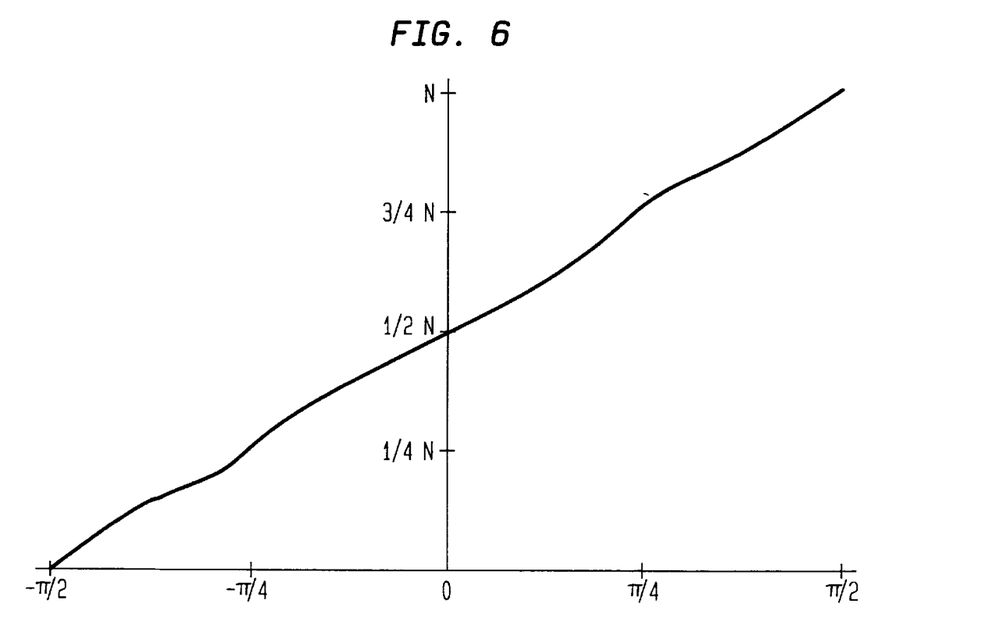

FIG. 6 shows the plot of the gray-level values as a function of $\theta$ for the particular value $\phi=\pi/4$.

Figure 7:
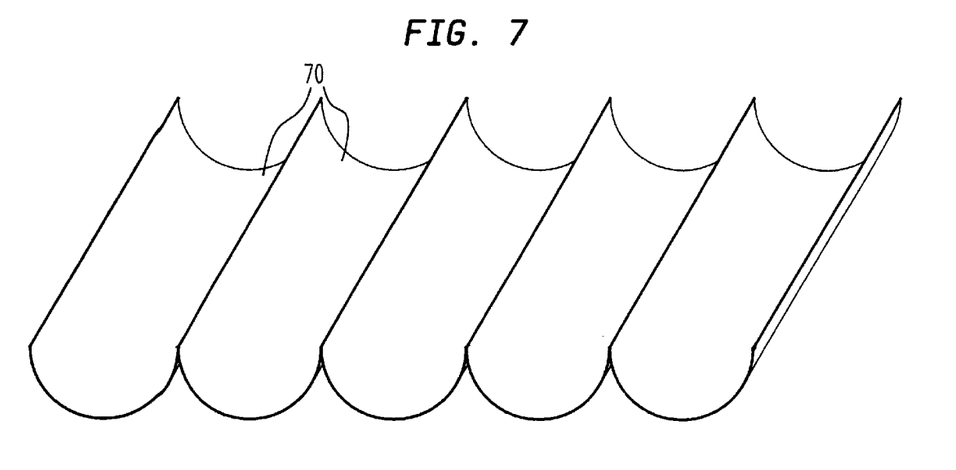
Figure 8:
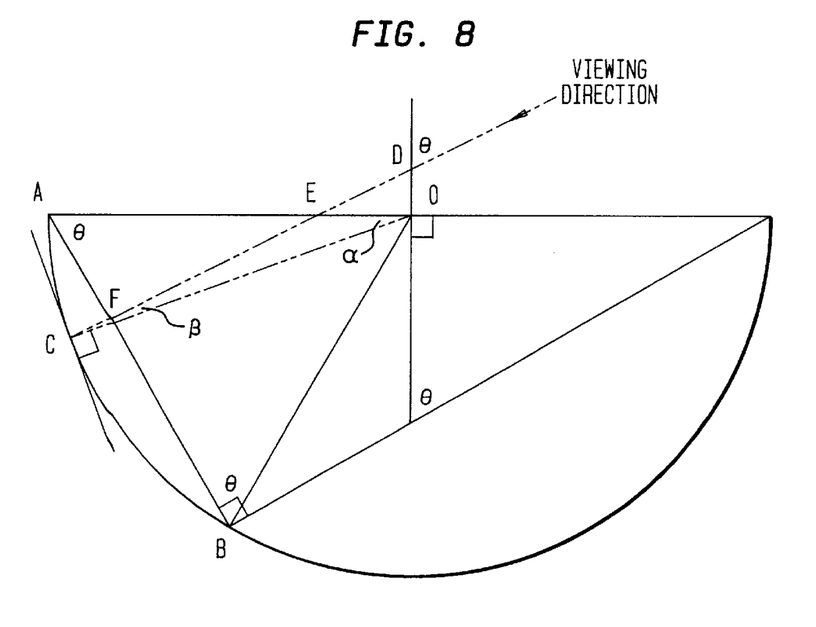

An alternative is to use, in place of the row of triangular prisms, a surface comprised of a row of several semicircular troughs 70, as shown in FIG. 7. This particular surface has the amazing property that if each trough is colored linearly, then the viewing angle is a linear function of the gray-level value observed. This can be seen with the help of FIG. 8. Let the viewing angle be $\theta$, so that $\theta = \angle CDO = \angle OAB = \angle OBA$, and $\angle AOB = \pi - 2\theta$. Then what is seen in one semicircular trough is the projection of arc $\overarc{AB}$ onto a line perpendicular to the viewing direction, and such a line segment is $\overline{AB}$. In FIG. 8, $\alpha$ designates the central angle of the semicircle measured counterclockwise starting from A.

The average gray-level observed is found by adding up the contributions from each point on $\overline{AB}$ and dividing by its length, which is $2R \cos \theta$ for a semicircle of radius R. The contribution of a point F on $\overline{AB}$ is the gray-level value of point C, the point on the semicircle in the viewing direction through F, times $\cos \beta$, where $\beta = \angle OCE$ is the angle between the viewing direction and the normal of the semicircle through C. We then have $\angle DEO = \pi/2 - \theta$ and $\angle OEF = \pi/2 + \theta$, and so $\beta = \pi/2 - \theta - \alpha$ and $\cos \beta = \sin(\alpha + \theta)$. The limits of integration are $\alpha = 0$ and $\alpha = \pi - 2\theta$, the measure of $\angle AOB$.

We choose the intensity to be the function $(1 - \alpha/\pi)N$ for $\alpha \in [0, \pi]$. The average gray-level observed is then $$\frac{N}{2R\cos\theta} \int_0^{\pi - 2\theta} \left(1 - \frac{\alpha}{\pi}\right) \sin(\alpha + \theta) R \, d\alpha = \left(\frac{1}{2} + \frac{\theta}{\pi}\right) N \quad (3)$$

The above is valid for $\theta \in [0, \pi/2)$. For $\theta \in (-\pi/2, 0]$, a similar diagram and argument show that the average gray-level value seen is $$\frac{N}{2R\cos\theta} \int_{0+2\theta}^{\pi} \left(1 - \frac{\alpha}{\pi}\right) \sin(\alpha + \theta) R \, d\alpha = \left(\frac{1}{2} + \frac{\theta}{\pi}\right) N \quad (4)$$

Thus the average gray-level observed for this semicircular fiducial increases linearly from 0 to 1 as $\theta$ increases from $-\pi/2$ to $\pi/2$. The graph of the gray-level as a function of $\theta$ is similar to that in FIG. 6, with a straight line segment replacing the curve in that figure.

Figure 9:
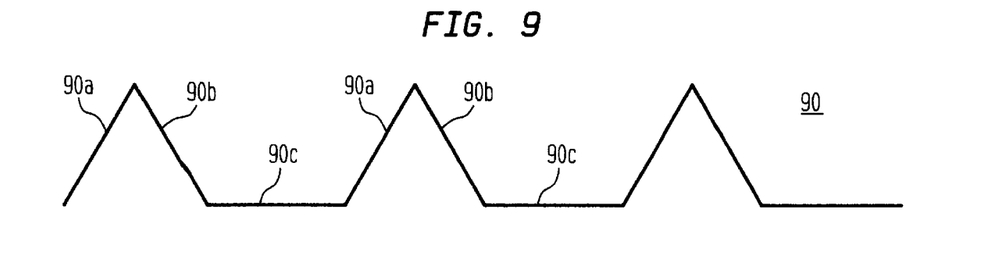
Figure 10:
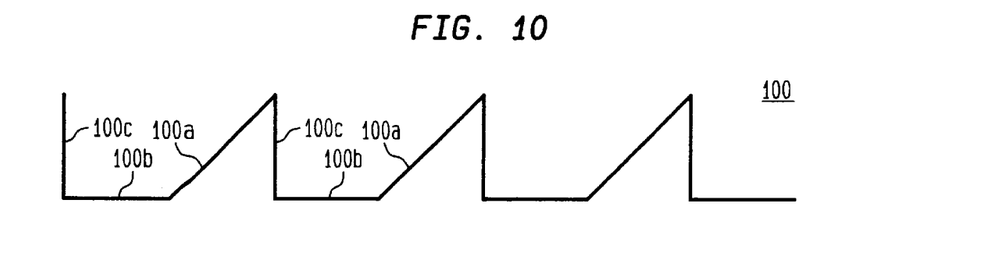

In general, if we have two images $I_1(x, y)$ mapped to a serrated surface we can determine the image seen by looking at it from arbitrary positions in space. We could address an interesting inverse problem in this context. Given what we would like to see, determine whether a pair of functions $I_1(x, y)$, $I_2(x, y)$ exist to achieve this and if these do exist, find them. Also note that other types of serrated profiles might be considered. For example, we might use a surface with planes facing three distinct directions as shown in FIGS. 9 and 10. In FIG. 9, the surface 90 includes both left- and right-facing portions 90A, 90B plus a horizontal portion 90C. In FIG. 10, the surface 100 includes a left-facing portion 100A and horizontal and vertical portions, 100B and 100C.

Figure 11:
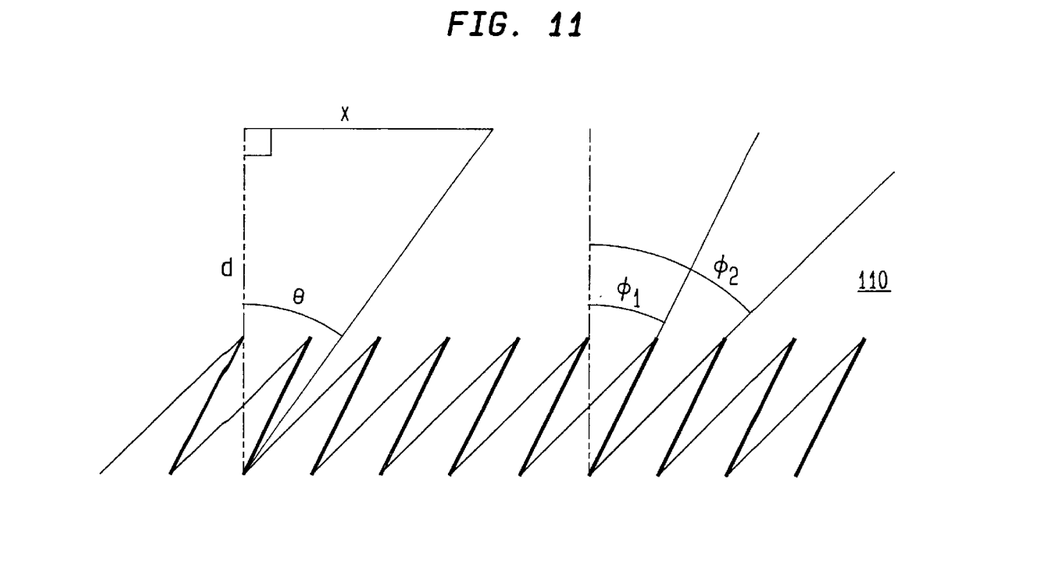

A potential shortcoming of the above fiducials is that the accuracy they provide might not be sufficient in some instances for the user's purpose. If space in the scene permits, we can introduce more fiducials, each of which is geared to a narrow range of viewing directions. This can be accomplished with a series of Agam pictures, using a high-precision fiducial 110 of the form shown in cross section in FIG. 11. Heavy and light lines 111, 112 represent surfaces painted black and white. Vertical lines 115 make angles of $\phi_1$ and $\phi_2$ with the white and black surfaces, respectively, and an angle $\theta$ with the viewing direction. The planar surfaces make angles of $\phi_1$ and $\phi_2$ with the vertical, where $\phi_1$ and $\phi_2$ are relatively close in value. The planar surfaces alternate between black and white in color once more as indicated by the thin and wide lines, but this time the whole gray-level spectrum is swept as the viewing angle $\theta$ changes from $\phi_1$ to $\phi_2$.

Figure 12:
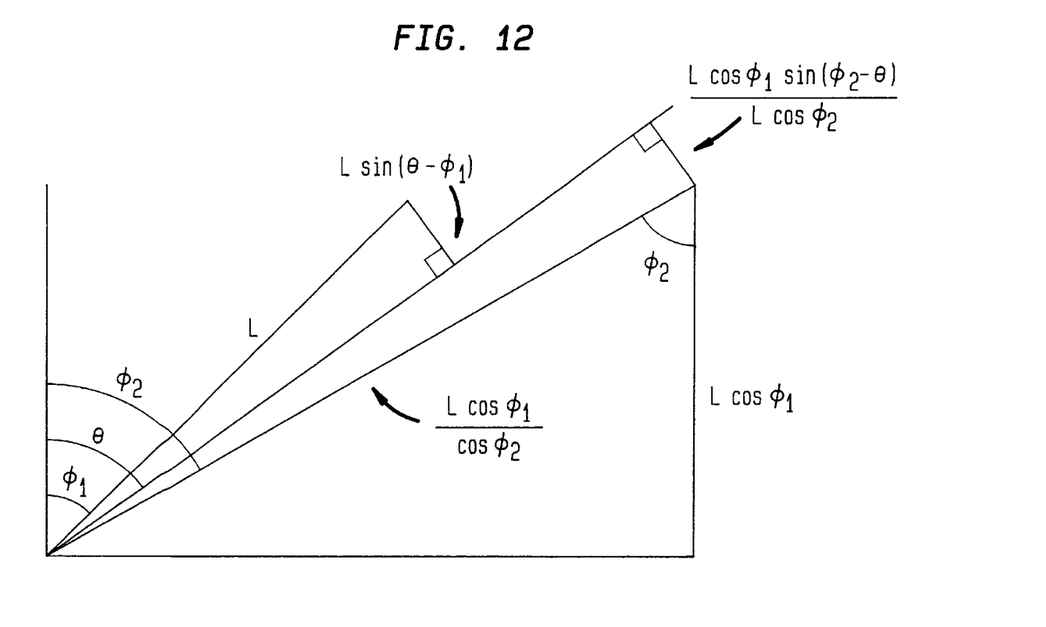

As was the case previously, if x measures the distance along the length of the fiducial, then the gray-level value observed increases linearly with x. This can be seen with the help of FIG. 12, which is a detailed cross section of one trough of the space fiducial of FIG. 11. The lengths of the projections of the white and black pieces onto a line perpendicular to the viewing direction are $L \sin(\theta - \phi_1)$ and $L \cos \phi_1 \sin(\phi_2 - \theta)/\cos\phi_2$, respectively, where the width of the white strip is taken to be L. Thus the gray-level observed by averaging these numbers is $$\frac{L\sin(\theta - \phi_1)}{L\sin(\theta - \phi_1) + L\frac{\cos\phi_1 \sin(\phi_2 - \theta)}{\cos\phi_2}} N = N\tan\theta - \frac{\tan\phi_1}{\tan\phi_2 - \tan\phi_1} \quad (5)$$

Equation (5) reduces to Equation (1) when $\phi_1$ and $\phi_2$ are replaced by $-\phi_1$ and $\phi_1$, respectively. From Equation (5) we see that the gray-level value increases linearly from 0 to N with $\tan \theta$ as $\theta$ increases from $\phi_1$ to $\phi_2$.

Figure 13:
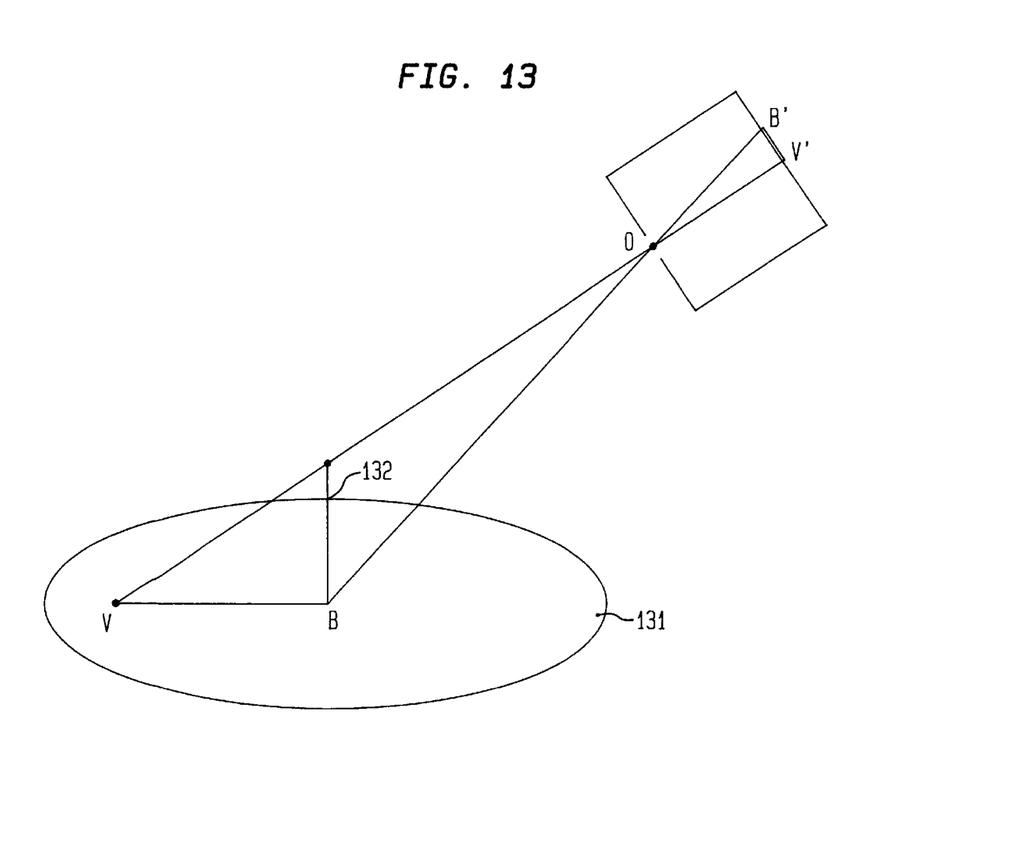

A different family of space fiducials is suggested by the sundial. A sundial is a device that tells time by measuring the direction toward the sun. We could therefore use the time readouts for "sun" pose estimation. Also, a camera could in principle look at a sundial and read out its own position, if it can establish what part BV of the sundial base 131 is occluded by its needle 132, as seen in FIG. 13.

Figure 14:
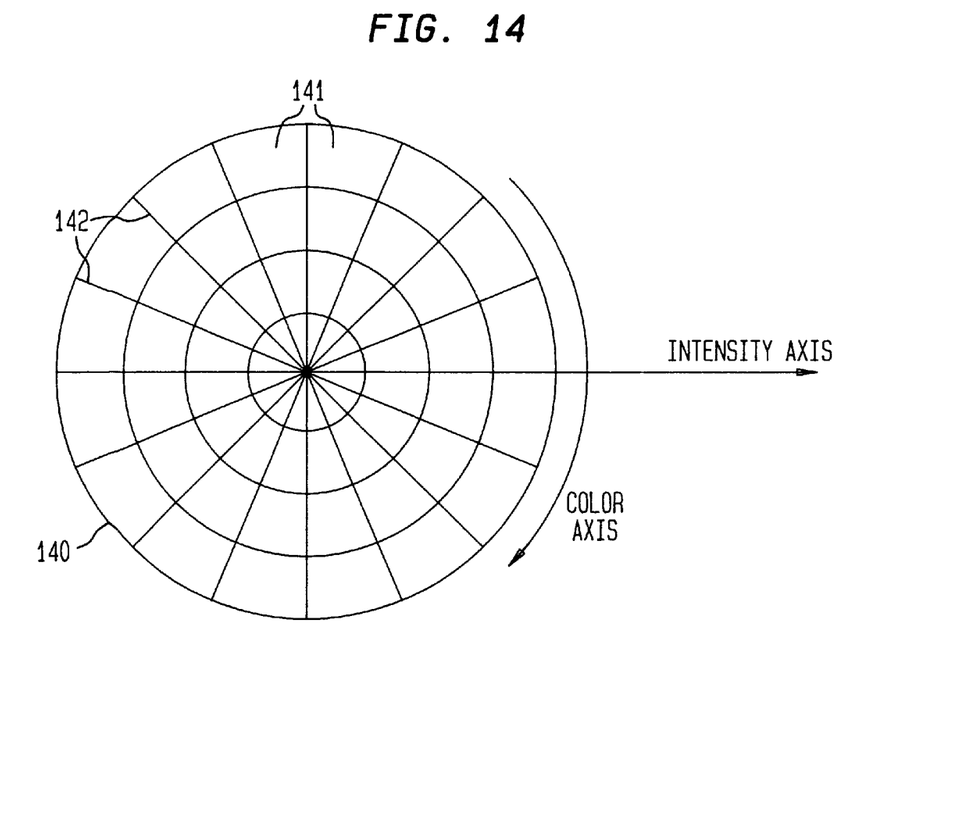

Therefore we could put on the base of a sundial-type of space fiducial a pattern that implicitly measures the length of the needle and its angular position. There are, here too, several possibilities. For one such possibility, we can combine a planar, circular base 140 with concentric color bands 141 and radial position markers 142 that would provide direct length and angle readouts as shown in FIG. 14.

Figure 15:
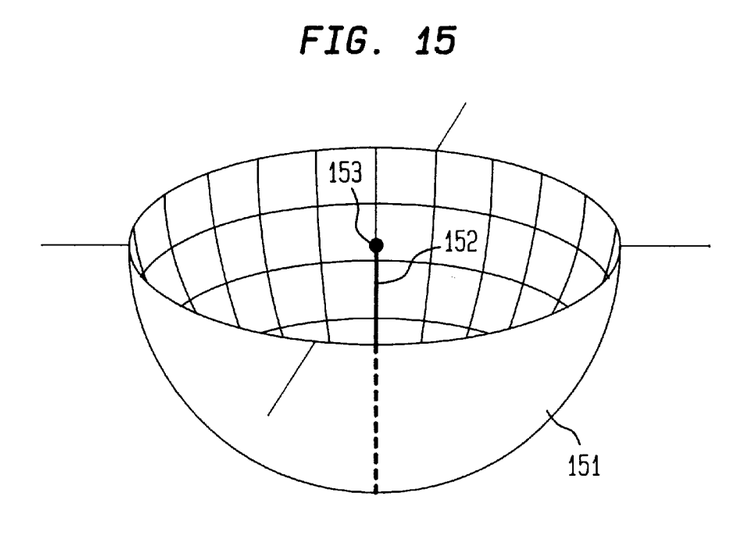

Many refinements are possible. The base 151 of the sundial can be made concave, of which perhaps the most practical shape is a hemisphere, as seen in FIG. 15. Here instead of measuring the length and angle of the projection of the needle 152, the camera's position can be read by observing the color and intensity coordinates of the projection of the needle tip 153 with the needle 152 extending axially from the south pole 154 of the hemisphere 151. In this case we obtain a dual to the transparent-dome space fiducial mentioned earlier. Now the camera's position can be determined by observing the color and its intensity, or hue, where the projection of the needle tip 153 falls on the hemisphere.

Figure 16:
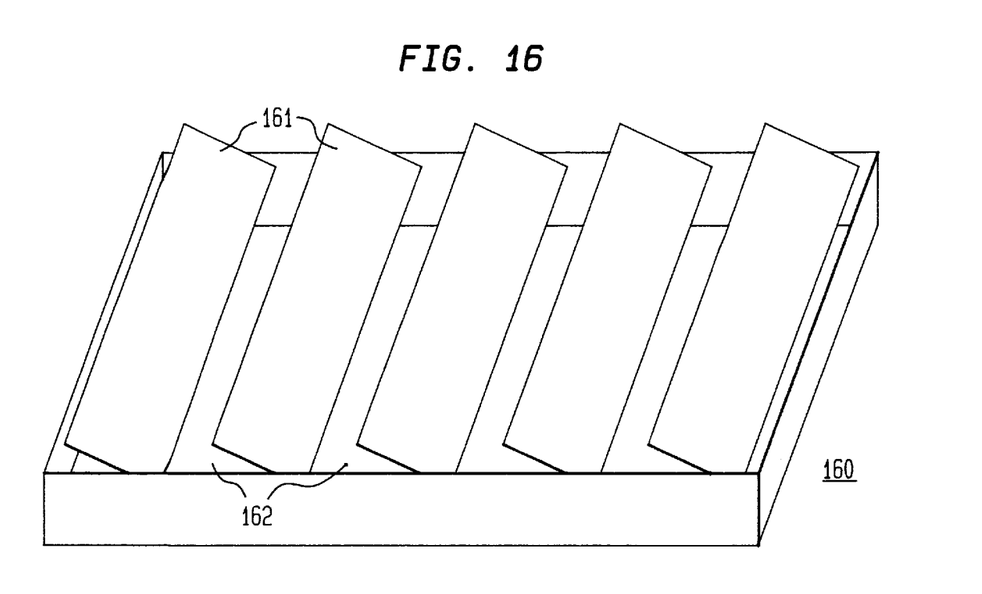
Figure 17:
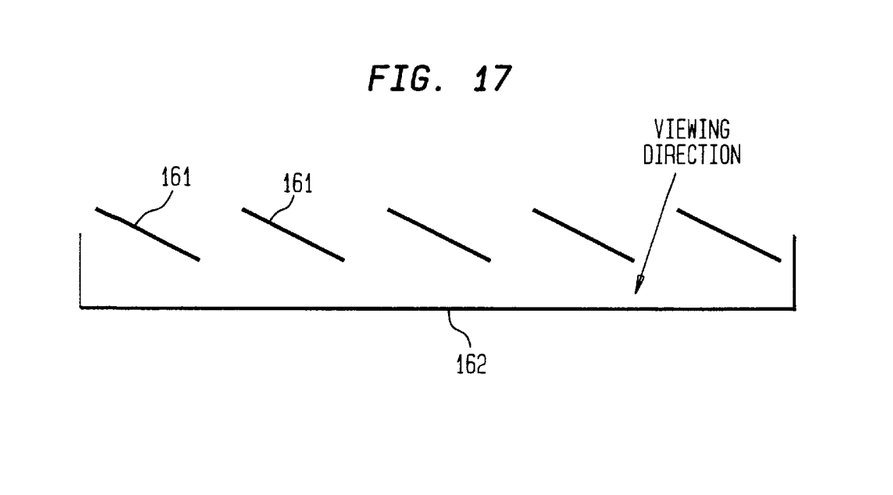
Figure 18:
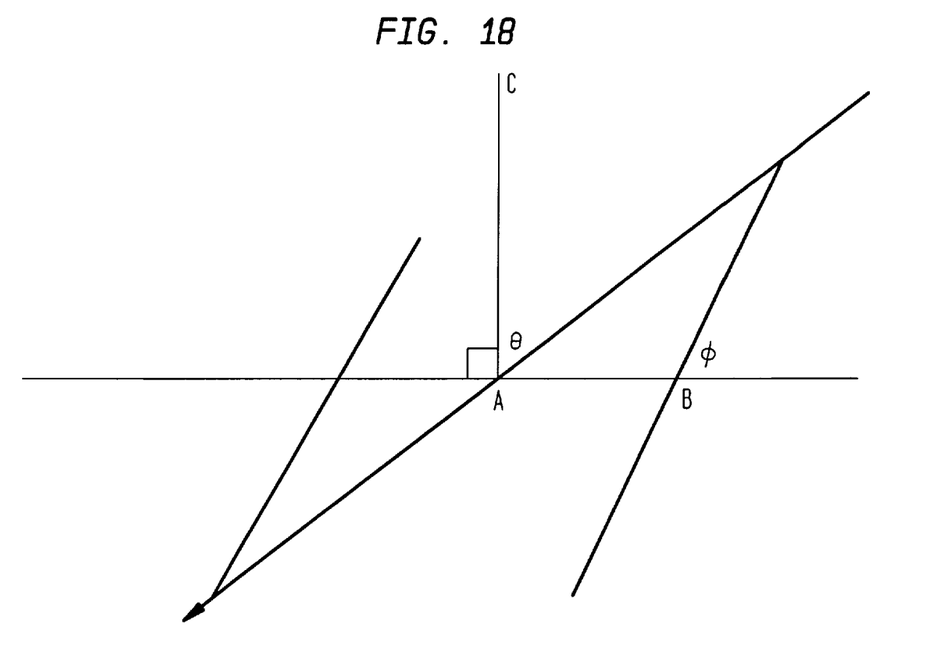

If we can assume that the cameras we are using can take video images (i.e., scan the environment continuously rather than taking snapshots), we can use the temporal dimension also to facilitate the process of pose determination. For example, returning to the Agam idea we can build a dynamic space fiducial 160, seen in FIG. 16, of the following type: several parallel strips 161 of white material rotate in synchrony about their long axes above a black background 162. The time when the white blades 161 become invisible, with respect to the moment when the background 162 is first completely covered, will tell the camera the direction from the space fiducial toward its focal point. Specifically, let $\theta$ be the viewing angle as before and $\phi$ the angle the strips 161 make with the horizontal axis, as in FIG. 18. When $\phi = \theta$, an all-white view is seen. For $\theta \in (0, \pi/2)$, as $\phi$ increases the image intensity decreases until $\phi = \pi/2 - \theta$, when the image is all-black. As $\phi$ continues increasing, the hue of gray-level increases until the image is all-white again, at $\phi = \pi - 2\theta$. In FIG. 18 is illustrated the time instant, for $\theta > 0$, at the beginning of a time interval when the image is all white. AB=BC since the strips just touch when they are horizontal, so $\angle BAC=\phi/2$ and $\phi=\pi-2\theta$. The image is then solid white for $\pi-2\theta \leq \phi \leq \pi$, and then the cycle repeats. Thus over one cycle, the image is all-white for the fraction $2\theta/\pi$ of the time. We can consider limiting cases of the viewing angle $\theta$. When $\theta=0$, the image is all-white at just one time instant (when $\phi=0$). At the other extreme, as $\theta \to \pi/2$, the image tends to being all-white the entire time. An analysis similar to that used in deriving Equation (1) shows that the observed gray-level is $|\cos(\theta+\phi)|/\cos \theta$ when $0<\phi<\pi-2\theta$ and 1 otherwise.

If $\theta \in (-\pi/2,0]$, the picture is symmetric with respect to the case when $\theta$ is positive. When $\theta$ is negative, the image is all-white from $\phi=0$ to $\phi=-2\theta$, and is all-black at $\phi=\pi/2-\theta$. The image is all white the fraction $-2\theta/\pi$ of the time. Combining the cases of positive and negative $\theta$, we see that if the image is all-white the fraction k of the time, where $0 \leq k1$, then $|\theta|=k\pi/2$. Alternatively, we may observe that the angular difference in $\phi$ between the "all-black" time instant and the start or end of the "all-white" interval is $\pi/2-|\theta|$. Therefore if the ratio of this length of time to the length of one cycle (when $\phi$ increases to $\pi$ plus its original value) is r, then $|\theta|=(\frac{1}{2}-r)\pi$. We cannot determine whether $\theta$ is positive or negative, or equivalently, if the viewing direction is from the left or the right, from this information alone. This matter can be settled if we have another indication when the white strips are horizontal. If this marker is observed at the start of the "all-white" interval, then $\theta$ is positive, while $\theta$ is negative if the marker is observed at the end of an "all-white" interval.

As in the earlier FIG. 3 arrangement, one can use two or more orthogonal arrays to provide location at the intersection of two or several known planes/directions.

Clearly this is just one of the many approaches that can exploit the temporal variations seen in some dynamic shapes to extract precise location information. We could for example use temporal, rather than color coding, in conjunction with the mantis-eye space fiducial of FIG. 1 too.

In particular, one could arrange to have light-emitting diodes or some other light sources at the base of the hollow tubes that comprise a mantis-eye space fiducial and light these in some ordered fashion that will tell the location of the camera by the delay of seeing the light versus some reference light clock (that could be made always visible).

Figure 19:
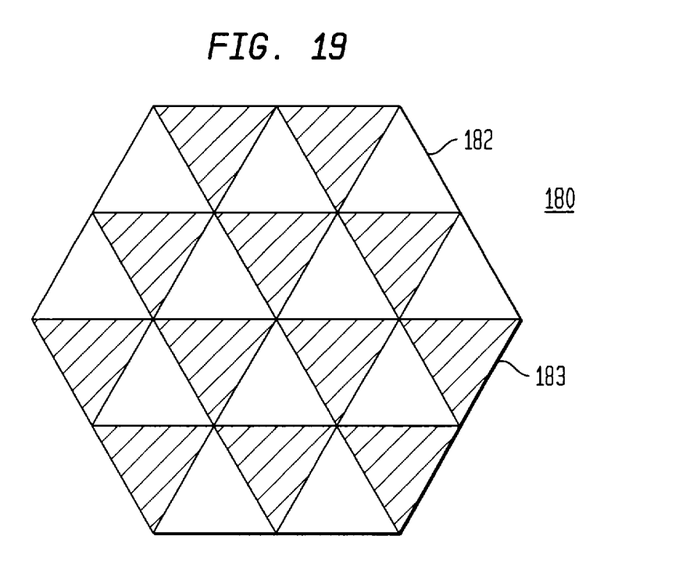

It is also possible to design space fiducials that are based on feature locations that involve more advanced image processing algorithms. In this context, the issue of optional (point) feature location for best performance represents one approach. In particular, if one wishes to pack as many point features as possible within a planar region with the aim of locating them precisely, a pattern that locates these points at intersections of several long lines whose position is easy to determine precisely is attractive. In particular, the pattern 180 shown in FIG. 19, consisting of closely-packed feature points, at the vertices of the white triangles 182 and black triangles 183, combines good feature packing with the ability to locate precisely the points as intersections of lines.

Accordingly, it is to be understood that the specific space fiducials and the particular manner of use described are merely illustrative of the general principles of the invention and various other forms of space fiducials and of their manners of use can be devised without departing from the spirit and scope of the present invention.

What is claimed:

1. A computer process for the pose estimation of a camera viewing a scene that comprises the steps of positioning in the scene to be viewed a space fiducial that comprises an object that has a corrugated surface having a plurality of segments including at least a first group of which each segment has a uniform first inclination and a first color and a second group of which each segment has a uniform second inclination different from the first inclination with respect to the camera and a different second color such that the relative fractions of the colors of the two groups seen by the camera are an indication of the pose of the camera, and using such relative fractions for determining the pose of the camera.

2. A computer process in accordance with claim 1 in which the space fiducial includes a second corrugated surface similar to the first-mentioned corrugated surface but positioned orthogonal to it.

3. The process of claim 2 in which the space fiducial includes third and fourth corrugated surfaces corresponding essentially to said first and second corrugated surfaces, respectively, said first and second corrugated surfaces being supported on a base of one color and the third and fourth corrugated surfaces being supported on a base of a second color different from the one color.

4. A computer process for the pose estimation of a camera viewing a scene that comprises the steps of positioning in the scene a space fiducial that has an essentially dome-like surface and a plurality of cones extending from the core of the dome to the surface, each designed to transmit a band of light of a bandwidth specific to the cone, positioning at the core of the dome a source of light that includes each of the specific bands of wavelengths, and converting the wavelength of the light emanating from the cone aligned with the camera's line of sight into a measure of the pose of the camera.

5. A computer process for the pose estimation of a camera viewing a scene that comprises the steps of positioning in the scene to be viewed a space fiducial whose image varies cyclically with time, viewing the scene at spaced times for providing successive images of the space fiducial spaced in time, and computing the pose of the camera from the change in appearance of the successive images of the space fiducial.

6. The process of claim 5 in which the appearance of the space fiducial is cyclical in time length of time of a prescribed appearance is a measure of the pose of the camera.

7. The process of claim 5 in which the space fiducial comprises a plurality of parallel strips of one color that rotate in synchrony for covering to a varying extent a base member of a second different color and detecting the resulting hue for providing a measure of the pose of the camera.

8. The process of claim 5 in which the space fiducial comprises a rotating means for varying the hue of the space fiducial periodically as seen by the camera, whereby by detecting the time of a reference value of the hue there is derived a measure of the pose of the camera.

* * * * *